Dec. 3, 1935.                E. J. SCHNAITTER                 2,023,244
                              BALANCE INDICATOR
                         Filed April 25, 1932          2 Sheets-Sheet 2
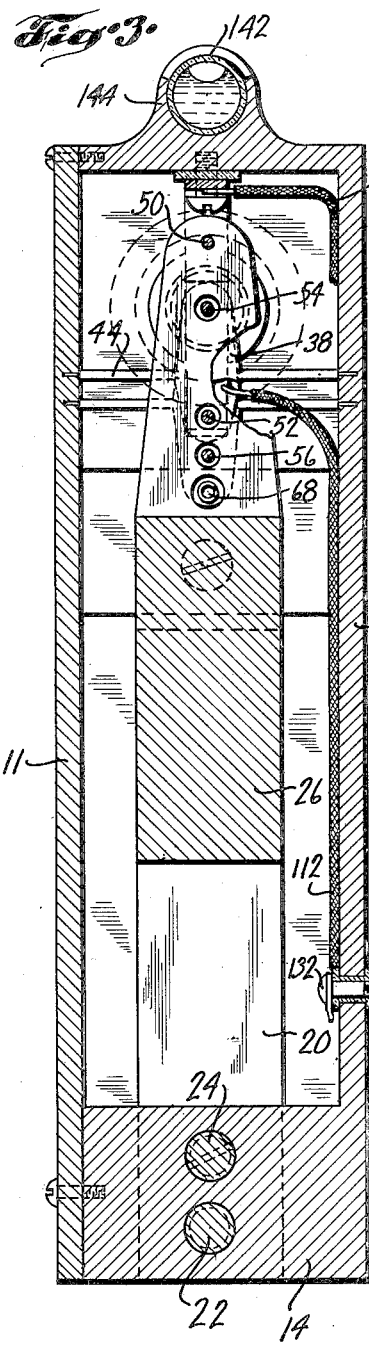
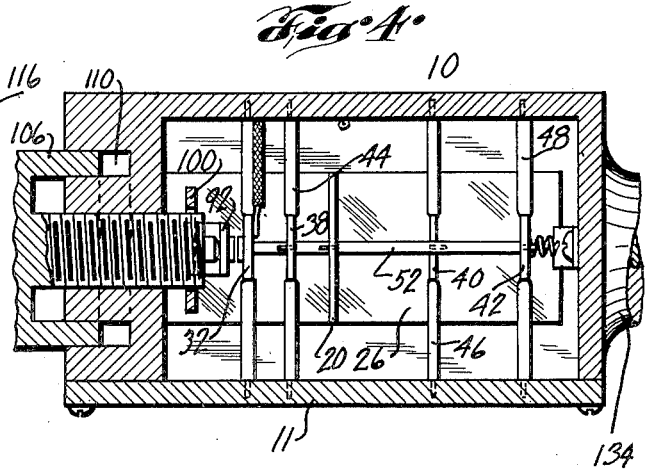
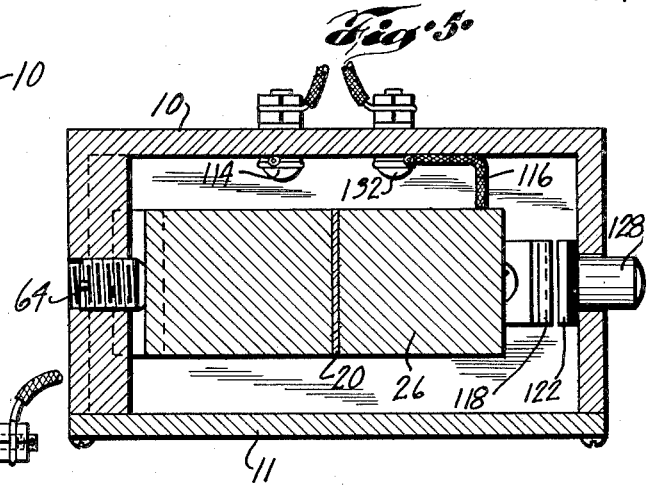
Inventor
EDGAR J. SCHNAITTER
By
Roy McEilers
Attorney Patented Dec. 3, 1935

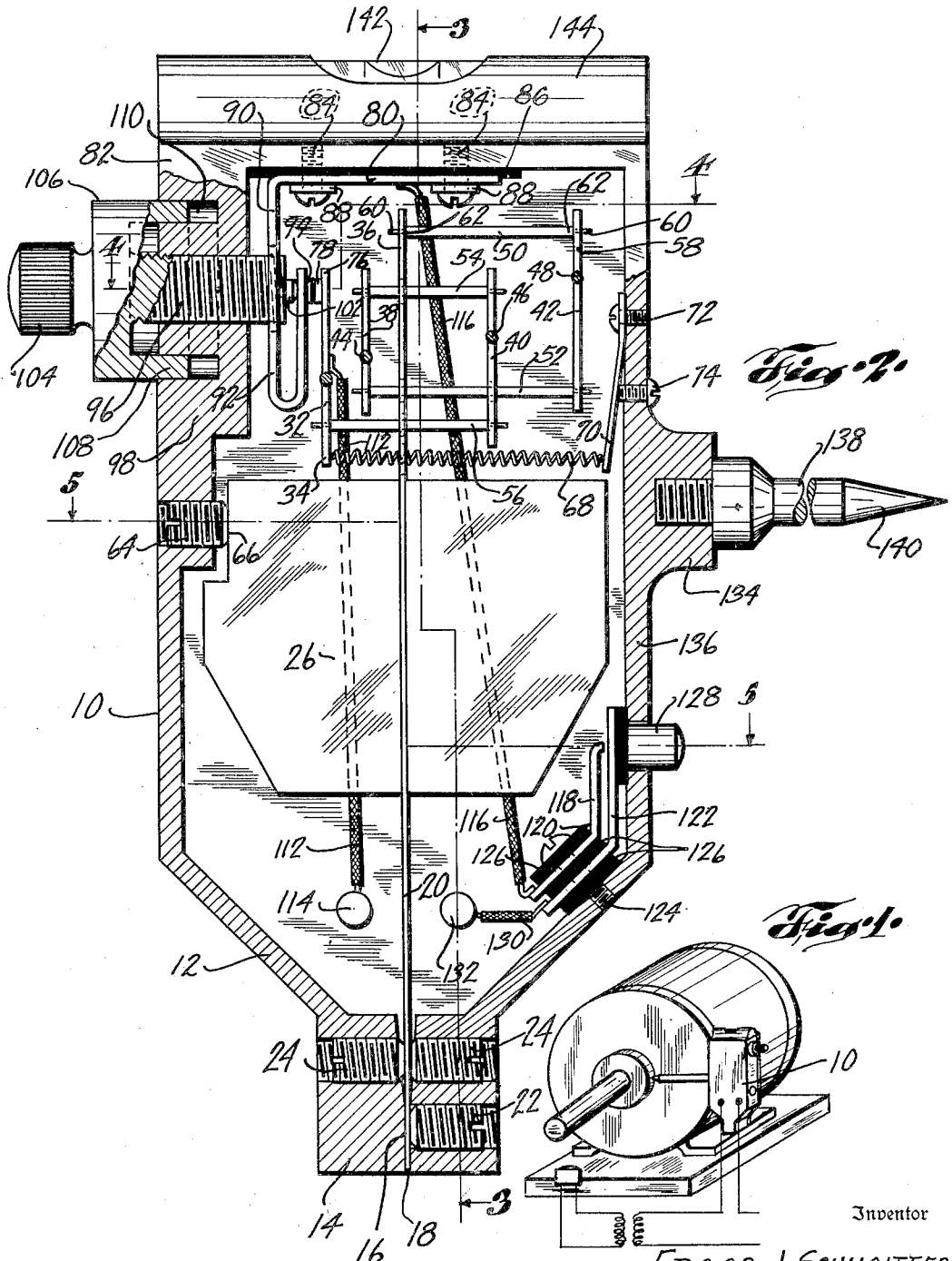

2,023,244

UNITED STATES PATENT OFFICE 2,023,244

BALANCE INDICATOR

Edgar Joyce Schnaitter, Beloit, Wis., assignor to Fairbanks, Morse & Co., Chicago, Ill., a corporation of Illinois Application April 25, 1932, Serial No. 607,366

14 Claims. (Cl. 73—51)

This invention relates to improvements in balance indicators, and more particularly to an improved balance indicator for use in locating points of static or dynamic unbalance in a rotating element of a machine, such as, for example, the rotor element of an electric motor or the like.

An object of this invention is to provide an improved balance indicator, including a contactor device, which may be readily applicable to the location of the heavy, or unbalanced side of a rotating element in a machine that is out of dynamic or static balance.

A further object of this invention is to provide an improved vibration-actuated contactor device, which may be employed in electric circuit relation with a gaseous-discharge type of illuminant, such as a neon lamp or grid indicator, the combination thereof composing a balance indicator for detecting the balance condition of a rotating machine element.

A still further object of this invention is to provide an improved vibration-controlled contactor device which may be neatly and compactly mounted in a suitable case of such dimensions as to permit the device to be conveniently transported and applied to a number of points on a machine under test.

Further objects and advantages will appear from the following description of the invention, and from the appended drawings, in which:

Fig. 1 is a side elevation, in perspective, of the contactor device as applied for testing a rotating portion of a machine, the device being shown connected in circuit relation with a winding of a transformer such as used to supply a neon lamp; Fig. 2 is a sectional side elevation of the contactor device, showing the arrangement of the mechanism within its case; Fig. 3 is a sectional end elevation of the device, as taken along the line 3—3 in Fig. 2; Fig. 4 is a transverse sectional elevation of the device, as taken along the line 4—4 in Fig. 2, and Fig. 5 is a transverse sectional elevation of the device, as taken along the line 5—5 in Fig. 2.

Proceeding now with a description of the contactor device, and referring to the drawings by numerals, 10 and 11 designate, respectively, a housing or frame structure, and a cover for enclosing and supporting the contactor mechanism, the housing being formed with a convergent portion 12, on its lower end, to provide for a thickened bottom portion 14, for a purpose presently appearing. The housing may be formed, preferably of an aluminum alloy or other light and inexpensive material. A slot 16 is provided in the thickened portion 14 of the housing to receive one end 18 of a resilient member 20, which may be formed from spring-steel or like material, the spring being securely held in the slot by a set-screw 22. The upper portion of the slot 16 is substantially wedge shaped as shown in Fig 2, to allow for lateral adjustment of the spring, the adjustment being effected and maintained by suitable set-screws 24, disposed in the housing portion 14, one on each side of the spring. A weight 26 having a moment of inertia greater than that of the housing and mechanism combined, for a purpose presently to appear, is secured, by any suitable means, to the midsection of the spring 20. The spring end 18 is filed thin to offer as little resistance as possible to the inertia of the weight 26.

A pivoted contact arm 32, for a purpose presently appearing, is connected on its end 34, with the upper end 36 of the spring 20 through a series of lever arms 38, 40 and 42, mounted on pivot members 44, 46 and 48, respectively, and lever arm link members 50, 52, 54 and 56. The pivot members are preferably journaled in the side walls of the case, as shown in Fig. 4, for a purpose presently to appear. Joining the upper end 58, of the lever arm 42, with the end 36 of the spring 20, is the link 50, having its end turned small to form bearing pins 60 and shoulder portions 62, the pins being secured in suitable apertures provided in the lever arm and spring. The link shoulder portions, abutting the spring and lever arm ends, are provided to transmit to the lever system, when the instrument is in use, the relative movement between the weight and the housing, in which the lever arm pivot is journaled. A similar construction and manner of assembly and operation, between the remaining lever arms, obtains with the link members 52, 54 and 56, which, by reason of the position of the pivots 44, 46 and the pivot contact arm 32, extend through apertures in the spring member 20, the apertures being of such dimension as to permit free horizontal movement of the link members (Fig. 3). The pin joints of the link members with the lever arms need not be secured in assembly by any holding means adjacent the lever arm apertures. If a vibration impulse is transmitted to the housing, causing it to move to the right (Fig. 2), the lever arms, being attached to the housing through the pivots journaled therein, will move also to the right. And, since the spring and weight have a large moment of inertia, relative to that of the combined housing and mechanism, the spring end 36 will tend to remain fixed, as the end 58 of the lever 42 moves to the right (Fig. 2). Tending to prevent any disconnection of the parts of the lever system, an adjustable set-screw 64 is provided in an end wall of the housing 10 to abut an end portion 66 of the weight, thus limiting the range of motion of the housing to the right, with respect to the weight 26.

A tension spring 68 is secured between the end 34 of contact arm 32, and the end of a spring adjusting strip 70, the strip being fastened to the inside of the frame wall by means of a screw 72, and the spring tension adjusted by a screw 74. The spring 68 serves to load the lever system to prevent play between the parts thereof, and to prevent the pin elements of the levers receding from the apertures therefor, and in addition, this spring serves to maintain a force on the contact arm 32 tending to move the arm end 76, and contact 78 mounted thereon, to the left (Fig. 2). The contact 78 may be of any material usually employed for electrical contacts, such as German silver, or the like.

It is to be understood that the above described system of levers and link members is merely a preferred form, and that any other form or system, suitable for the purpose of amplifying the movement of the contact arm 32, when the instrument is subjected to vibration impulses, may be substituted without altering or impairing the general operation of the instrument.

A semi-flexible metal strip 80 is securely mounted on the under side of the housing wall portion 82 by screws 84, the strip being insulated from the wall and screws by a suitable insulating piece 86 and insulating washers 88. The portion 90 of the metal strip is bent so as to hang vertically, and its lower end turned back to form a U shaped portion 92, upon the end of which is mounted a contact 94, facing the contact 78 for engagement therewith. The U shape gives a certain amount of flexibility to the end portion, for adjustment purposes. A contact adjusting screw 96 is secured in a threaded aperture in a thickened or inwardly bossed portion 98 of the housing side wall, the screw end extending through an aperture in a section of the metal strip portion 90. The section through which the end of the screw projects, is spread, preferably in a circular manner, as at 100 (Fig. 4), to provide for an opening larger in diameter than that of the screw, so as to preclude any electrical contact between the screw and the strip portion 90. A screw end-button 102, of any suitable insulating material, is secured, by any suitable means, to the end of the screw 96, for abutting engagement with the end of the U shape metal strip portion 92. To provide for close adjustment of the contact points 78 and 94, the screw is formed with a small screw pitch giving a small axial movement for each revolution of the screw. Integrally formed with the screw portion, and externally of the housing, is a knurled knob 104 for manual operation of the adjusting screw. Between the knob and screw portions, and integral therewith, is a cylindrical cup 106 having the cup wall portion 108 slidably seated in a circular groove 110 in the boss portion 98 of the housing, and concentric of the screw aperture. The cup portion in the groove serves to relieve the fine threads from external impacts, and may, through the provision of suitable indicia (not shown) on the periphery of the cup portion, serve to indicate the setting of screw 96.

The contact 78 and lever arm 32 are electrically connected by a lead 112 to a terminal 114, mounted in the side of the housing, the terminal being suitably insulated from the wall of the housing. The contact 94 and metal strip 80 are electrically connected by a lead 116 to a switch contact member 118 of a suitable switch 120, the switch being mounted on the inside of the housing wall. The switch 120 is composed of switch contact members 118 and 122, suitably insulated from each other, as well as from the mounting screw 124 and the housing, by insulating washers 126. A push-button 128, protruding through an aperture provided in the housing side, is provided for closing the contacts 118 and 122 against the spring action of the contact member 122, which tends to maintain the switch in open position. The contact member 122 is electrically connected by means of a lead 130 to a terminal 132, mounted in the case wall, and suitably insulated therefrom.

Formed integrally with the case, is an external, solid, raised portion 134, positioned centrally of the housing wall 136. Centrally mounted thereon, as by means of a threaded joint, is a vibration transmitting member, or feeler rod 138, edged or pointed at its end 140, the rod being provided to transmit vibration impulses from an unbalanced rotating machine, to the case, and to the mechanism contained therein; the instrument being placed so that the point 140 is positioned firmly against any suitable portion of the machine, such as a bearing housing. The rod may be formed from any material which is adapted to transmit vibration impulses, and may be made in a number of different lengths to suit various conditions of operation.

On the top portion of the housing is mounted a spirit level 142, held in a recess 144 integral with the case, as an aid to the operator in maintaining the case in a level position, during the operation of the instrument.

In the method utilized in the use of the instrument, to locate the heavy or unbalanced side of a rotating element of a machine, such as a rotor or shaft, it is necessary that some part of the rotating element be visible. A chalk mark or like indication is made on a visible portion of the element, and the machine brought up to normal speed. Now with the contactor instrument in circuit, for example, with a suitable neon lamp, and the point of the rod 138 held against a bearing housing, or some point on the machine to which vibration is transmitted from the rotating element, the contacts 78 and 94 may be adjusted, by means of adjusting screw 96, until the neon lamp flashes steadily, giving one flash for a each revolution of the rotating element. As may be observed from the construction of the described contactor device, the contact points open when the vibration impulse is directed toward the contactor housing. As the weight 26 remains practically stationary, due to its greater inertia, the movement of the lever system, in opening and closing the contacts, is, therefore, controlled by movement of the frame or housing, the vibration being transmitted to the levers through the pivot bearings in the frame sides. The neon lamp may now be positioned at such an angle about the axis of rotation of the machine under test, that it illuminates and renders visible, the marked portion of the rotating element, the lamp being held in such angular relation to the contactor, with reference to the axis of the machine under test, that the mark will appear to be stationary. The heavy side of the rotating element of the machine may be found, when the machine is brought to rest, as being on the side of the contactor device, when the rotating element is manually revolved so that the mark is in the same angular relation that it appeared while rotating; assuming, however, that the machine was tested at a speed below its principal critical vibration speed. If the machine normally operates above this critical speed, an apparent angular displacement of the mark, through 180 degrees, will be noted, the heavy portion then being found on the side opposite to that on which the contactor device is positioned. Before the balance indicator can be applied for test purposes, it is necessary, therefore, to determine by any of the usual or suitable means, on which side of its critical speed, the particular machine under test normally operates.

It will be understood that the foregoing description of the method employed in the use of the device is confined to the testing of a machine which is adapted for one direction of rotation only, such as, for example, a turbine, or centrifugal pump. To obtain a greater accuracy in the determination of the unbalanced condition of a rotating element, it is desirable to apply the balance indicator to the machine under test in each direction of rotation. The marked portion, as described above, will not appear in the same angular relation to the contactor device for each direction of rotation, due, principally, to the inherent lag in the contactor mechanism. The position of the heavy side of the rotating element may then be found, as described above, by taking a spot on the rotating element which is half-way between the angular positions of the marked portion, as it appeared in each direction of rotation. This procedure will, also, correct any optical error which may occur in observing the marked portion which the machine is rotating, such as any error due to a sustained image of the mark, or like effect. To insure still further accuracy, the contactor device may be applied to each end of the rotating element, to enable a more exact location of the heavy side of the element under test.

To aid in placing and holding the neon lamp during the test operation, the lamp may be, for example, of tubular form, and mounted on a circular frame (not shown), so that it may be moved and clamped in any angular position with respect to the axis of rotation of the machine under test. If it is desired, an angularly graduated scale may be mounted on the frame to indicate the setting of the lamp.

It will, of course, be understood that the present description and accompanying drawings refer only to a preferred form of this invention, and that substantial changes may be made without altering the full intended scope of this invention, as set out in the appended claims.

I claim:—

1. In a vibration indicator, a contactor device including paired, relatively movable contacts, a frame constituting a mounting for said device, an inertia element carried by said frame and disposed for movement with one of the paired contacts and relative to the other thereof, a plurality of connected levers arranged for transmitting vibration impulses to the contactor device through said frame, a spring connected to the frame, and through one of said levers to the said one of the contacts, and pivots for certain of said levers, carried by the frame, and arranged, with the levers, to amplify the vibrations imparted to the frame.

2. In a vibration indicator, a contactor device including paired complementary contacts, a frame by which said contacts are carried, an inertia element, a spring strip supporting the inertia element, and by which said element is floatingly mounted in said frame, means including a portion of the spring strip, for operatively connecting the inertia element to one of said contacts, and an element fixedly carried by and coacting with said frame for transmitting vibration impulses to the contacts, from apparatus under test.

3. In a vibration indicator, paired complementary contacts, a support for said contacts, an inertia element, a motion-amplifying connection between said inertia element and one of said contacts, a biasing element secured to the support, and operatively associated with the last said contact through said connection, and means for yieldingly connecting said inertia element to said support.

4. In a vibration indicator of electrical type, a portable contactor device including a case for supporting and enclosing the contactor mechanism, a member projecting from said case, for transmitting vibration impulses to the contactor device through said case, paired contacts in the case, an inertia element yieldably supported within the case, and a lever system connected between the inertia element and one contact, a spring tending to bias the last said contact toward circuit-closing position, and means for adjusting the loading of said spring externally of the case.

5. In a vibration indicator of electrical type, a portable contactor mechanism including a case for supporting and enclosing the other elements of the mechanism, a slotted portion formed in a wall of said case, the slot therein being tapered, a metallic spring strip, having one end engaging said slot, a weight carried by said strip, relatively movable contacts arranged to be opened and closed by vibration of the case, one thereof being operatively associated with said spring strip, means for holding said spring strip in the slot, and means for adjusting the angular position of the spring strip in said slot, whereby to center the weight in said case.

6. In a vibration indicator, a contactor device of portable type including a pair of electrical contact elements, a case adapted to be subjected to vibration from apparatus under test, one of said contacts being mounted for vibration with the case, a spring strip adjustably secured to a wall portion of the case, a weight carried by said spring strip, a spring-loaded connection from said weight to the other contact element, means for adjusting externally of the case, the spring-loading of said connection, and means for adjusting, externally of the case, the position of the first said contact element with respect to the case.

7. In a vibration indicator, a portable contactor device including a case, an elongate spring, a weight on said spring, means for adjustably securing said spring to the case, a pivoted contact arm, motion-amplifying means connecting the spring to the contact arm, and means carried by the case, for transmitting thereto vibrations from apparatus under test.

8. In a vibration indicator, a contactor device of portable type including a case, a weighted spring, means for fastening the spring to said case, a stationary contact arm, a pivoted contact arm, means operatively connecting the pivoted arm to said spring, for movement of the pivoted arm in one direction, a second spring tending to actuate the arm in an opposite direction, means for adjusting the loading of said second spring, and means for adjustably positioning the stationary contact relative to the pivoted contact arm.

9. In a vibration indicator, a portable contactor device including a case serving as an enclosure for the device, a pair of electrical contacts, supporting arms for said contacts, means for adjusting, externally of the case, the horizontal position of one of said supporting arms, a weighted spring, a motion-increasing linkage connecting said spring to the other of said supporting arms, and operable responsively to vibration impulses received by the case, for actuating one of the contacts relative to the other contact, and means controllable externally of the case, for variably biasing the contact on the last said supporting arm toward that on the first said arm.

10. In a vibration indicator, a portable contactor device, including a case, a spring, an inertia element carried by said spring, adjustable means for securing the spring to said case, a pair of contacts, contact-carrying arms, means connecting the spring and one of said arms for actuating the contacts toward one position, a second spring for actuating the contacts toward the opposite position, means associated with the other of said arms for adjusting the position of said arm, and means for adjusting the loading of said second spring, said adjusting means being adapted for access externally of the case.

11. In a vibration indicator, a portable electrical contactor device including a case for supporting and enclosing the contactor mechanism, said device including a relatively stationary contact, a relatively movable contact, one contact being carried by the case, and adapted to be subjected therethrough to vibrations from apparatus under test, an inertia element movably mounted within the case, a motion-multiplying linkage connecting the inertia element to the other contact, the linkage including a polygonal arrangement of levers and lever-connecting arms, the levers being pivotally supported within the case, a switch in the side of a circuit connected to one of said contacts, said switch being positioned within the case, and means for actuating the switch externally of the case.

12. In an electrical device for indicating overbalance conditions in a machine under test, a portable contactor device including a case, an inertia element within the case, a flexible support for the inertia element, an adjustable anchorage by which the support is secured to a wall portion of the case, paired complementary contacts, one thereof being carried by the case, a system of levers operatively engaging the other contact for closing actuation under influence of said inertia element, a spring adjustably anchored to the case, and tending to bias the last said contact toward circuit-closing position.

13. A portable electrical contactor for use with a vibration indicator, and including a case arranged to be subjected to vibration from apparatus under test, an inertia element floatingly supported within the case, a pair of relatively movable contacts, one thereof carried by the case, a system of connected levers and lever arms operatively connecting the inertia element to the other contact, a lever return spring having connection with said last contact and to the case, adjusting means for varying the loading of said spring, a holder for the first said contact, means for adjusting the position of said holder with respect to the case, said adjusting means being arranged for access exteriorly of the case.

14. In a portable contactor assembly for use with a vibration indicator of electrical type, a case, a resilient metallic tongue adjustably secured at its lower or inner end, to a lower wall of the case, an inertia or weight element carried by said tongue and spaced upwardly of the lower wall of the case, said tongue extending beyond the weight element, a pair of complementary contacts within the upper portion of the case, a screw by which one of the contacts is adjustably mounted in a wall of the case, a system of levers connecting the inertia element to the other contact, pivots for certain of said levers bridging the case walls and so located with respect to the levers as to constitute therewith, a multiplying connection from the inertia element to the lever-connected contact, a return spring for said lever system, an adjustable anchorage for said return spring, and a switch in circuit with one of said contacts and disposed for access exteriorly of the case.

EDGAR JOYCE SCHNAITTER.